May 22, 1956  F. K. H. NALLINGER  2,746,763
VEHICLE FRAME
Filed June 6, 1950  2 Sheets-Sheet 1
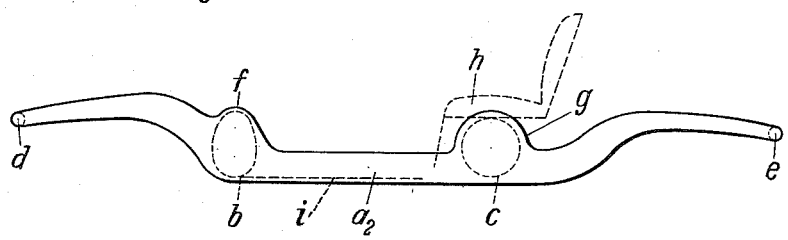
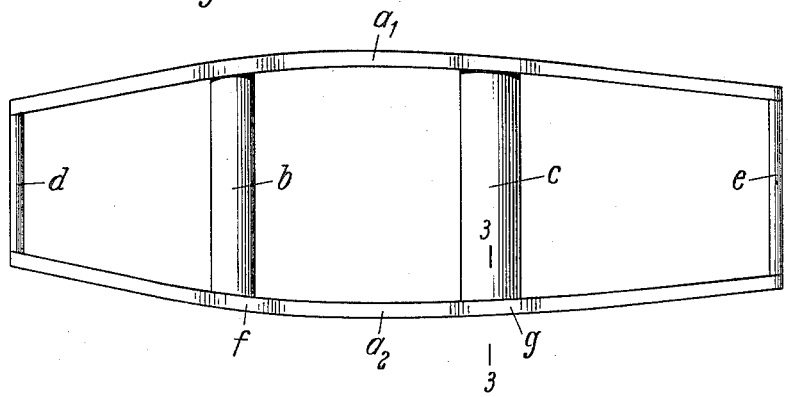
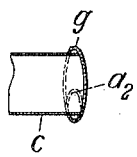
Inventor
Friedrich K. H. Nallinger
By Dicke and Padlon
attorneys May 22, 1956 F. K. H. NALLINGER 2,746,763
VEHICLE FRAME
Filed June 6, 1950 2 Sheets-Sheet 2
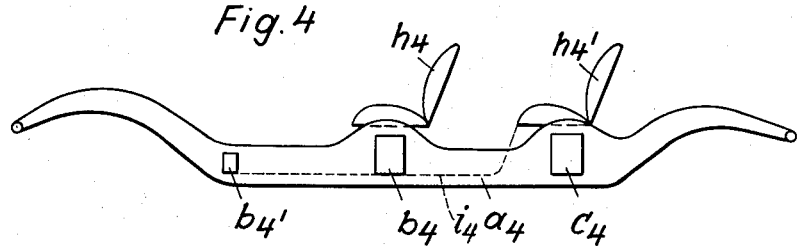
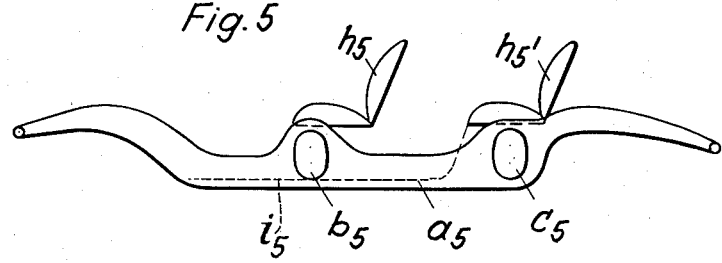
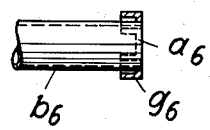 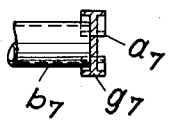
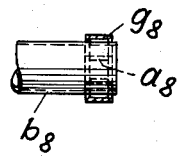 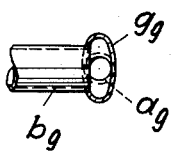
INVENTOR
FRIEDRICH K. H. NALLINGER
BY Dicke and Padlon
ATTORNEYS.

United States Patent Office 2,746,763
Patented May 22, 1956

2,746,763

VEHICLE FRAME

Friedrich K. H. Nallinger, Stuttgart, Germany, assignor to Daimler-Benz Aktiengesellschaft, Stuttgart-Unterturkheim, Germany Application June 6, 1950, Serial No. 166,358

Claims priority, application Germany January 5, 1949

8 Claims. (Cl. 280—106)

This invention relates to a vehicle frame having longitudinal and cross members and more particularly to a frame adapted for use in motor vehicles.

Objects of the present invention are preferably to provide a frame construction securing rigidity and stability against twisting and bending and at the same time permitting a low center of gravity of the vehicle to the greatest possible extent.

Further objects of the invention are to provide a clear and as much as possible unobstructed floor area and suitable utilization of the cross members for convenient spacing of the seats.

Accordingly an important feature of the invention consists in so constructing the cross-sectional dimensions of the girders that the cross members have a higher, for example, at least twice as high or higher, and suitably also wider cross-sectional dimension than the longitudinal members. Consequently, the cross members are overproportioned and are suitably arranged in a manner, particularly below the seats, so as not to cause any obstructions on the floor which is therefore kept clear for the feet, and at the same time fully or nearly fully utilize all the height between the lower edges of the seats and the lower edge of the frame, which is kept at a distance from the road surface which is actually not larger than necessary for the road clearance.

According to another feature of the invention the cross members are preferably of special light-weight construction so that, notwithstanding their relatively supernormal cross-sectional dimension and great rigidity and stability, they do not require a greater or essentially only an immaterially greater amount of material than cross members of normal proportion. According to a further feature of the invention and in order to equalize the difference in height between longitudinal and cross members at the points where they join one another, the longitudinal members are increased in height at these points, preferably only thereat, so that a satisfactory, twist-free connection between longitudinal and cross members may be established. Furthermore, the cross members are preferably of hollow construction, for example, of tubular or box-section cross-section and are either butt welded to the longitudinal members or to still greater advantage, for stability and rigidity, are extended through the longitudinal members and welded thereto.

The fact that the longitudinal members are quite narrow in relation to the cross members will, in combination with a low position of the frame and floor, secure the further advantage that boarding the car is made especially convenient.

In the accompanying drawings showing preferred embodiments of the invention:

Fig. 1 is a side view of a frame with two over proportioned cross members;

Fig. 2 is a plan view of Fig. 1;

Fig. 3 is a sectional view taken on line 3—3 of Fig. 2;

Fig. 4 is a side view of a modification of the embodiment shown in Figs. 1 and 2;

Fig. 5 is a side view of another modification of the embodiment shown in Figs. 1 and 2; and Figs. 6 to 9 inclusive are detail cross sectional views of various connections of the longitudinal beams with the cross beams.

The frame consists of two longitudinal members $a_1$, $a_2$, two main cross-members $b$ and $c$ and, for example, two end cross-members $d$ and $e$. The cross member $b$ may be, by way of example, of oval tubular cross-section with a greater vertical diameter and may be arranged within the range of the front panel of the vehicle body ahead of the foot space of the front seats, whereas the cross member $c$ being, for example, of circular cross-section runs below the seats $h$. The two longitudinal members $a_1$, $a_2$ are provided with terminal portions which in the direction of adjacent vehicle ends and following the enlarged portions $f$ and $g$ are bent upwardly and thereupon extend slantingly downwardly therefrom, whereby the downwardly slanting terminal portions are also curved slightly inwardly so that the two end cross-members $d$ and $e$ are shorter than the two main cross-members $b$ and $c$. The floor is schematically illustrated in Figure 1 by reference character $i$.

The longitudinal beams $a_1$, $a_2$ have, over their entire length, a substantially constant profile or cross section of normal height, for instance of oval cross-section, as can be noted in particular from Fig. 3. Only at the points where the transverse beams $b$ and $c$ join the longitudinal beams, are they, as indicated at $f$ and $g$, provided with upwardly extending enlargements, so shaped that they essentially are adapted to the profile of the transverse beams, and the transverse beams can be connected over their entire periphery with the longitudinal beams, for instance by welding. As shown in Fig. 3, the transverse beams are guided for this purpose through the inner wall of the longitudinal beam to the outer wall and welded to same, or to the inner wall. The thickness of the material of the transverse beams $b$ and $c$ is, in this connection, as shown in Fig. 3, less than that of the longitudinal beams $a_1$, $a_2$.

In the case shown in Figs. 4 and 5, two seats or rows of seats $h_4$, $h_4'$ or $h_5$, $h_5'$ respectively are arranged behind each other in the vehicle. The transverse beams $b_4$, $c_4$ and $b_5$, $c_5$ respectively are arranged under the seats or rows of seats respectively. The transverse beams $b_4$, $c_4$ furthermore have a box-like cross-section while transverse beams $b_5$, $c_5$ have an oval cross-section. Furthermore, in the case of Fig. 4, a further transverse beam $b_4'$ is arranged, for instance, on the front wall of the frame in front of the foot space of the driver, which transverse beam has a customary cross-section of normal size. If desired, however, there may also be used at this place a transverse beam having an over-dimensioned cross-section.

Figs. 6 to 9, inclusive, show, furthermore, a few embodiments of the cross-sections of the longitudinal beams and their connection with the transverse beams. In the case of Fig. 6, the longitudinal beam $a_6$ has a U-shaped cross-section, which is correspondingly enlarged in height at the places of connection with the transverse beams. Transverse beam $b_6$ which, for instance, has a round or box-shaped cross-section, is in this case passed through the wall of the longitudinal beam and is welded to same.

Fig. 7 shows an I-shaped longitudinal beam $a_7$ having a corresponding enlargement $g_7$ in vertical direction and a transverse beam $b_7$ passing obliquely with respect to same.

In the case of Fig. 8, a longitudinal beam having a square cross-section $a_8$ is used which is enlarged at the places of connection with the transverse beam $b_8$ in vertical direction so as to form a rectangular cross-section $g_8$. The transverse beam $b_8$ is, in this connection, passed through both walls of the longitudinal beam.

In the case of Fig. 9, the longitudinal beam $a_9$ having in itself a circular cross-section is enlarged at the places of connection into an oval cross-section $g_9$ in the inner wall of which the transverse beam $b_9$ is welded.

It will be obvious that the details of construction may be varied from those shown in the drawing. I therefore do not limit myself to such details.

What I claim is:

1. A frame for motor vehicles having a seat therein and a foot space in front thereof, comprising a floor, a cross-member extending below the seat and having a hollow cross-section of such height that it extends essentially from the lower surface lying next to the floor of the vehicle close to the surface supporting the seat, a pair of opposed laterally spaced side-members each on one side of the vehicle connected with said cross-member and each having a longitudinal portion whose cross-section is substantially less than that of the cross-member and the lower edge of which is approximately at the level of the lower edge of the cross-member, while the upper edge of the cross-member extends substantially above the upper edge of the longitudinal portion of the side-members, said side-members having enlarged portions directed upwardly to the seat at the places of the connection with the cross-member, the latter coming up against said enlarged portions and being rigidly connected therewith, said side-members extending with a low section through the region of the foot space in front of said seat.

2. A frame according to claim 1 having a second cross-member arranged in front of the foot space, said second cross-member having substantially the same height in cross-section as said first-mentioned cross-member, and further including upwardly directed enlarged portions in said side-members to which enlarged portions said second cross-member is connected.

3. A frame for motor vehicles having a floor, comprising a hollow cross-member, the lower edge of said hollow cross-member lying approximately at the level of said floor, a pair of opposed laterally spaced side-members each on one side of the vehicle and having a longitudinal portion whose cross-section is substantially less than that of said cross-member and the lower edge of said side-members lying also approximately at the level of said floor, the upper edge of said cross-member extending substantially above the upper edge of the longitudinal portion of said side-members, said side-members including enlarged areas directed upwardly from said floor, said cross-member extending in the direction of said enlarged areas and being rigidly connected therewith, while said side-members extend with a lower section behind and in front of said cross-member.

4. A frame according to claim 3, wherein said cross-member is made of thinner material than said longitudinal members.

5. A frame according to claim 3, wherein said cross-member has an oval cross-section of greater height than width.

6. A frame according to claim 3, said vehicle further including a seat, and wherein said cross-member extends below said seat.

7. A frame according to claim 3, wherein said cross-member is connected to said longitudinal member along the entire periphery of said cross-member, and wherein said cross-member is shaped in a tubular manner.

8. A frame according to claim 3, further comprising a second cross-member located in front of said first cross-member, said second cross-member havnig substantially the same cross-sectional height as said first cross-member, and wherein said side-members include upwardly directed enlarged portions to which enlarged portions said second cross-member is connected.

References Cited in the file of this patent

UNITED STATES PATENTS

| 1,471,044 | Lovejoy | Oct. 16, 1923 |
| 2,026,658 | Sherman | Jan. 7, 1936 |
| 2,107,382 | Maddock | Feb. 8, 1938 |
| 2,174,922 | Kuiper | Oct. 3, 1939 |
| 2,571,908 | Lyman | Oct. 16, 1951 |

FOREIGN PATENTS

| 595,854 | Germany | Apr. 28, 1934 |
| 232,772 | Great Britain | Apr. 30, 1925 |